United States Patent
Willett et al.

(10) Patent No.: US 9,886,944 B2
(45) Date of Patent: Feb. 6, 2018

(54) HYBRID CONTROLLER FOR ASR

(71) Applicant: Nuance Communications, Inc., Burlington, MA (US)

(72) Inventors: Daniel Willett, Walluf (DE); Jianxiong Wu, Acton, MA (US); Paul J. Vozila, Arlington, MA (US); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/433,263

(22) PCT Filed: Oct. 4, 2012

(86) PCT No.: PCT/US2012/058613
§ 371 (c)(1),
(2) Date: Apr. 2, 2015

(87) PCT Pub. No.: WO2014/055076
PCT Pub. Date: Apr. 10, 2014

(65) Prior Publication Data
US 2015/0279352 A1    Oct. 1, 2015

(51) Int. Cl.
*G10L 15/00* (2013.01)
*G10L 15/02* (2006.01)
(Continued)

(52) U.S. Cl.
CPC ............. *G10L 15/02* (2013.01); *G10L 15/22* (2013.01); *G10L 15/30* (2013.01);
(Continued)

(58) Field of Classification Search
CPC ....... G10L 15/22; G10L 15/30; G10L 15/265; G10L 25/30; G10L 15/16; G10L 15/02;
(Continued)

(56) References Cited

U.S. PATENT DOCUMENTS 4,712,189 A    12/1987 Mohri
5,054,082 A    10/1991 Smith et al.
(Continued)

FOREIGN PATENT DOCUMENTS

CN    1764945 A    4/2006
CN    101971251 A    2/2011
(Continued)

OTHER PUBLICATIONS

PCT/US2012/058613, dated May 27, 2013, International Search Report.
(Continued)

*Primary Examiner* — Vu B Hang
(74) *Attorney, Agent, or Firm* — Wolf, Greenfield & Sacks, P.C.

(57) ABSTRACT

A mobile device is described which is adapted for automatic speech recognition (ASR). A speech input receives an unknown speech input signal from a user. A local controller determines if a remote ASR processing condition is met, transforms the speech input signal into a selected one of multiple different speech representation types, and sends the transformed speech input signal to a remote server for remote ASR processing. A local ASR arrangement performs local ASR processing of the speech input including processing any speech recognition results received from the remote server.

17 Claims, 3 Drawing Sheets

(51) Int. Cl.
*G10L 15/22* (2006.01)
*G10L 15/30* (2013.01)
*G10L 19/00* (2013.01)
*G10L 15/08* (2006.01)
*G10L 15/16* (2006.01)

(52) U.S. Cl.
CPC .......... *G10L 19/0017* (2013.01); *G10L 15/08* (2013.01); *G10L 15/16* (2013.01)

(58) Field of Classification Search
CPC ... G10L 15/08; G10L 15/1815; G10L 15/197; G10L 25/78
USPC .......................................................... 704/231
See application file for complete search history.

(56) References Cited

U.S. PATENT DOCUMENTS

| | | | |
|---|---|---|---|
| 5,148,471 A | 9/1992 | Metroka et al. | |
| 5,297,183 A | 3/1994 | Bareis et al. | |
| 5,544,228 A | 8/1996 | Wagner et al. | |
| 5,594,789 A | 1/1997 | Seazholtz et al. | |
| 5,632,002 A | 5/1997 | Hashimoto et al. | |
| 5,774,857 A | 6/1998 | Newlin | |
| 5,855,003 A | 12/1998 | Ladden et al. | |
| 5,943,648 A | 8/1999 | Tel | |
| 5,953,700 A | 9/1999 | Kanevsky et al. | |
| 5,956,683 A | 9/1999 | Jacobs et al. | |
| 5,960,399 A | 9/1999 | Barclay et al. | |
| 6,078,886 A | 6/2000 | Dragosh et al. | |
| 6,088,732 A | 7/2000 | Smith et al. | |
| 6,094,680 A | 7/2000 | Hokanson | |
| 6,098,041 A | 8/2000 | Matsumoto | |
| 6,119,087 A | 9/2000 | Kuhn et al. | |
| 6,173,259 B1 | 1/2001 | Bijl et al. | |
| 6,188,985 B1 | 2/2001 | Thrift et al. | |
| 6,195,641 B1 | 2/2001 | Loring et al. | |
| 6,216,013 B1 | 4/2001 | Moore et al. | |
| 6,282,268 B1 | 8/2001 | Hughes et al. | |
| 6,282,508 B1 | 8/2001 | Kimura et al. | |
| 6,327,568 B1 | 12/2001 | Joost | |
| 6,363,348 B1 | 3/2002 | Besling et al. | |
| 6,366,886 B1 | 4/2002 | Dragosh et al. | |
| 6,374,226 B1 | 4/2002 | Hunt et al. | |
| 6,408,272 B1 | 6/2002 | White et al. | |
| 6,424,945 B1 | 7/2002 | Sorsa | |
| 6,434,523 B1 | 8/2002 | Monaco | |
| 6,453,290 B1 | 9/2002 | Jochumson | |
| 6,456,974 B1 | 9/2002 | Baker et al. | |
| 6,487,534 B1 | 11/2002 | Thelen et al. | |
| 6,560,590 B1 | 5/2003 | Shwe et al. | |
| 6,594,628 B1 | 7/2003 | Jacobs et al. | |
| 6,604,075 B1 | 8/2003 | Brown et al. | |
| 6,604,077 B2 | 8/2003 | Dragosh et al. | |
| 6,615,171 B1 | 9/2003 | Kanevsky et al. | |
| 6,615,172 B1 | 9/2003 | Bennett et al. | |
| 6,671,669 B1 | 12/2003 | Garudadri et al. | |
| 6,738,743 B2 | 5/2004 | Sharma et al. | |
| 6,760,705 B2 | 7/2004 | Dvorak | |
| 6,832,380 B1 | 12/2004 | Lau et al. | |
| 6,912,588 B1 | 6/2005 | Jardin et al. | |
| 6,963,759 B1 | 11/2005 | Gerson | |
| 7,003,463 B1 | 2/2006 | Maes et al. | |
| 7,024,363 B1 | 4/2006 | Comerford et al. | |
| 7,050,977 B1 | 5/2006 | Bennett | |
| 7,058,643 B2 | 6/2006 | Vailaya | |
| 7,058,890 B2 | 6/2006 | George et al. | |
| 7,099,824 B2 | 8/2006 | Kushida et al. | |
| 7,137,126 B1 | 11/2006 | Coffman et al. | |
| 7,366,673 B2 | 4/2008 | Ruback et al. | |
| 7,389,234 B2 | 6/2008 | Schmid et al. | |
| 7,418,382 B1 | 8/2008 | Maes | |
| 7,519,536 B2 | 4/2009 | Maes et al. | |
| 7,610,204 B2 | 10/2009 | Ruback et al. | |
| 7,729,916 B2 | 6/2010 | Coffman et al. | |
| 8,082,153 B2 | 12/2011 | Coffman et al. | |
| 8,332,227 B2 | 12/2012 | Maes et al. | |
| 8,370,159 B2* | 2/2013 | Lee ......................... | G10L 15/30 370/204 |
| 8,868,425 B2 | 10/2014 | Maes et al. | |
| 8,898,065 B2 | 11/2014 | Newman et al. | |
| 8,930,194 B2 | 1/2015 | Newman et al. | |
| 9,196,252 B2 | 11/2015 | Ruback et al. | |
| 2002/0065660 A1 | 5/2002 | Cooklev et al. | |
| 2002/0077811 A1 | 6/2002 | Koenig et al. | |
| 2002/0091515 A1 | 7/2002 | Garudadri | |
| 2002/0091527 A1 | 7/2002 | Shiau | |
| 2003/0004720 A1 | 1/2003 | Garudadri et al. | |
| 2003/0046074 A1 | 3/2003 | Ruback et al. | |
| 2003/0120486 A1 | 6/2003 | Brittan et al. | |
| 2003/0125955 A1 | 7/2003 | Arnold et al. | |
| 2003/0139924 A1 | 7/2003 | Balasuriya | |
| 2004/0010409 A1 | 1/2004 | Ushida et al. | |
| 2004/0083109 A1 | 4/2004 | Halonen et al. | |
| 2005/0049860 A1 | 3/2005 | Junqua et al. | |
| 2005/0131704 A1 | 6/2005 | Dragosh et al. | |
| 2006/0149551 A1 | 7/2006 | Ganong et al. | |
| 2006/0195323 A1 | 8/2006 | Monne et al. | |
| 2006/0235684 A1 | 10/2006 | Chang | |
| 2007/0011010 A1 | 1/2007 | Dow et al. | |
| 2007/0276651 A1 | 11/2007 | Bliss et al. | |
| 2007/0286099 A1 | 12/2007 | Stocklein et al. | |
| 2008/0027723 A1 | 1/2008 | Reding et al. | |
| 2008/0126490 A1 | 5/2008 | Ahlenius | |
| 2008/0133124 A1* | 6/2008 | Sarkeshik ......... | G01C 21/3611 701/533 |
| 2008/0154612 A1 | 6/2008 | Evermann et al. | |
| 2008/0154870 A1 | 6/2008 | Evermann et al. | |
| 2008/0189111 A1 | 8/2008 | Ruback et al. | |
| 2009/0051649 A1 | 2/2009 | Rondel | |
| 2009/0204410 A1 | 8/2009 | Mozer et al. | |
| 2009/0253463 A1 | 10/2009 | Shin et al. | |
| 2009/0287477 A1 | 11/2009 | Maes | |
| 2010/0049521 A1 | 2/2010 | Ruback et al. | |
| 2011/0010168 A1* | 1/2011 | Yu ......................... | G10L 19/093 704/219 |
| 2011/0015928 A1 | 1/2011 | Odell et al. | |
| 2011/0054899 A1 | 3/2011 | Phillips et al. | |
| 2011/0060587 A1 | 3/2011 | Phillips et al. | |
| 2012/0030712 A1 | 2/2012 | Chang | |
| 2012/0035932 A1 | 2/2012 | Jitkoff et al. | |
| 2012/0179457 A1* | 7/2012 | Newman .............. | G10L 15/30 704/201 |
| 2012/0179463 A1 | 7/2012 | Newman et al. | |
| 2012/0179464 A1 | 7/2012 | Newman et al. | |
| 2012/0179469 A1 | 7/2012 | Newman et al. | |
| 2012/0179471 A1 | 7/2012 | Newman et al. | |
| 2013/0006620 A1 | 1/2013 | Maes et al. | |
| 2013/0151250 A1* | 6/2013 | VanBlon ............... | G10L 15/30 704/235 |
| 2014/0343948 A1 | 11/2014 | Maes et al. | |

FOREIGN PATENT DOCUMENTS

| | | |
|---|---|---|
| EP | 0 450 610 A2 | 10/1991 |
| EP | 0 654 930 A1 | 5/1995 |
| GB | 2325112 A | 11/1998 |
| JP | 09-098221 A | 4/1997 |
| JP | 10-207683 A | 8/1998 |
| JP | 10-214258 A | 8/1998 |
| JP | 10-228431 A | 8/1998 |
| WO | WO 97/47122 A2 | 12/1997 |

OTHER PUBLICATIONS

International Preliminary Report on Patentability for PCT/US2012/058613 dated Apr. 16, 2015.

Gopalakrishnan, P.S., "Compression of acoustic features for speech recognition in network environments," Proceedings of the 1998

(56) References Cited

OTHER PUBLICATIONS

International Conference on Acoustics, Speech and Signal Processing, May 12-15, 1998, vol. 2, pp. 977-980.

* cited by examiner

HYBRID CONTROLLER FOR ASR

The present application is a national stage application under 35 U.S.C. § 371 of PCT Application No. PCT/US2012/058613, filed Oct. 4, 2012, which is herein incorporated by reference in its entirety.

TECHNICAL FIELD

The invention generally relates to automatic speech recognition (ASR), and more specifically, to client-server ASR on mobile devices.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\mathrm{argmax}}\, P(W \mid A)$$

Given a system of statistical acoustic models, this formula can be re-expressed as:

$$\hat{W} = \underset{W}{\mathrm{argmax}}\, P(W) P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate the recognition result or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

U.S. Pat. Publication 20110054899 describes a hybrid client-server ASR arrangement for a mobile device in which speech recognition may be performed locally by the device and/or remotely by a remote ASR server depending on one or more criteria such as time, policy, confidence score, network availability, and the like.

SUMMARY

Embodiments of the present invention are directed to a mobile device and corresponding method for automatic speech recognition (ASR). A local controller determines if a remote ASR processing condition is met, transforms the speech input signal into a selected one of multiple different speech representation types, and sends the transformed speech input signal to a remote server for remote ASR processing. A local ASR arrangement performs local ASR processing of the speech input including processing any speech recognition results received from the remote server.

The local controller may transform the speech input signal and send the transformed speech input signal independently of whether or not the remote ASR processing condition is met. Or the local controller may transform the speech input signal and send the transformed speech input signal only if the remote ASR processing condition is met. The local controller may suspend transforming the speech input signal and sending the transformed speech input signal if it determines that the remote ASR condition is not met.

Even if the remote ASR processing condition is met, the local ASR arrangement may continue the local ASR processing. Or if the remote ASR processing condition is met, the local ASR arrangement processes may suspend local ASR processing except for processing speech recognition results received from the remote server.

The local controller may determine if the remote ASR processing condition is met while the local ASR arrangement is performing the local ASR processing. In that case, after the local controller determines that the remote ASR processing condition is met, it may start sending the transformed speech signal to the remote server starting from the beginning of the speech input signal. Or the local controller may determine if the remote ASR processing condition is met after the local ASR arrangement produces a recognition result.

The local controller may select one of the speech representation types based on different bandwidth characteristics of the speech representation types. The different speech recognition types may include one or more of ASR feature vectors, lossy compressed speech, lossless compressed speech, and uncompressed speech. The recognition results from the remote server may include one or more of unformatted recognition text, formatted recognition text, and a semantic interpretation.

The remote ASR processing condition may be a function of one or more of recognition confidence associated with local ASR processing of the speech input signal, connection condition between the mobile device and the remote server, projected accuracy benefit associated with the remote ASR processing (e.g., based on a metadata function reflecting one or both of application state and dialog context), a local ASR processing latency characteristic, a remote ASR processing latency characteristic, and a recognition cost characteristic.

Determining if the remote ASR processing condition is met may reflect an adaptation process based on speech recognition operation over time. For example, the adaptation process may be an automatic unsupervised adaptation process.

DETAILED DESCRIPTION

Various embodiments of the present invention are directed to hybrid ASR for a mobile device using a client-server arrangement. A local controller decides when to spend a speech input on to the remote server for recognition depending on such criteria as local recognition confidence score, condition of the data connection, etc. In addition, the local controller further selects a specific type of speech representation to send to the remote server, for example, based on bandwidth characteristics of the different types of speech representations.

Figure 1:
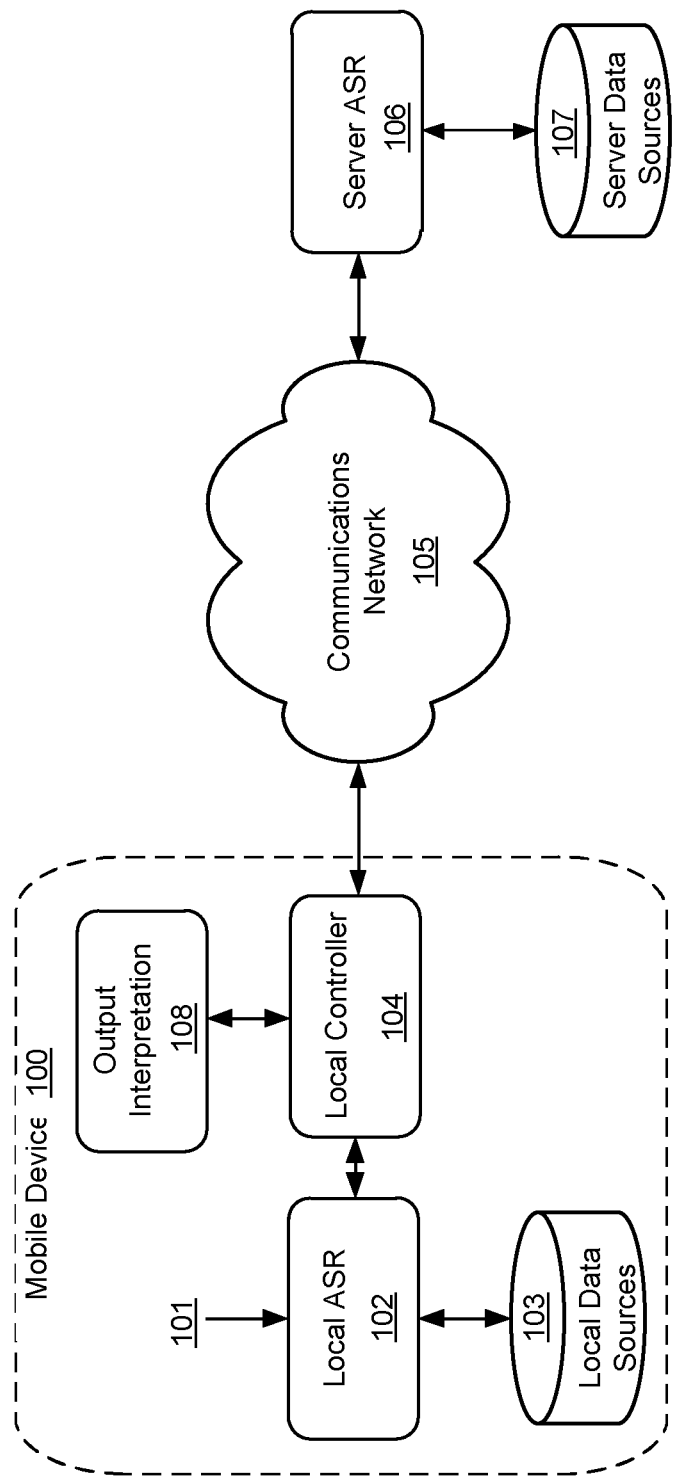
FIG. 1 shows various elements in a hybrid ASR arrangement according to an embodiment of the present invention.

FIG. 1 shows various elements in a hybrid ASR arrangement according to an embodiment of the present invention. A speech input 101 on mobile device 100 receives an unknown speech input signal from a user. A local controller 104 determines if a remote ASR processing condition is met, transforms the speech input signal into a selected one of multiple different speech representation types, and sends the transformed speech signal over a wireless communication network 105 to a remote server 106 having a remote ASR processing arrangement. A local ASR arrangement 102 uses local recognition data sources 103 to perform local ASR processing of the speech input signal including processing of any speech recognition results from the remote ASR server 106. The ASR server 106 uses server recognition data sources 107 to perform remote ASR processing and once that process is complete, returns its speech recognition result (unformatted recognition text, or derivatives of the result such as formatted recognition text or a semantic interpretation) back to the mobile device 100 as a recognition output result 108.

Figure 2:
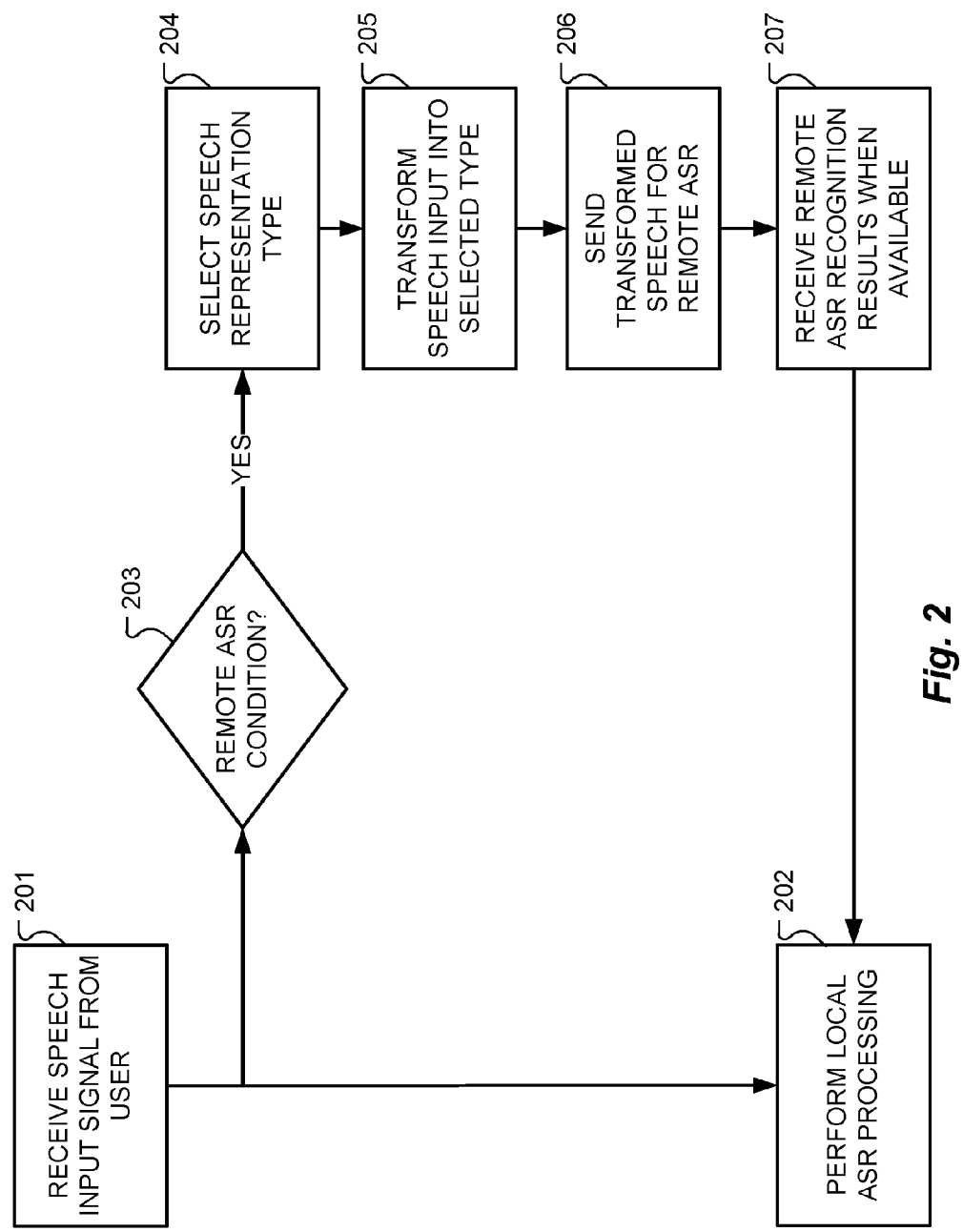
FIG. 2 shows various functional steps in a hybrid ASR arrangement according to one embodiment of the present invention.

In specific embodiments, the local controller 104 may transform the speech input signal and send the transformed speech input signal independently of whether or not the remote ASR processing condition is met. For example, FIG. 2 shows various functional steps in such an embodiment where the mobile device 100 initially receives an unknown speech input signal from a user, step 201, and forwards it to the local ASR arrangement 102 for local ASR processing, step 202. The local controller 104 determines if the remote ASR processing condition is met, step 203, and if so, selects a specific one of the different speech representation types, step 204, transforms the speech input signal into the selected type of speech representation, step 205, and sends the transformed speech input signal to the remote ASR server 106, step 206.

Once the remote ASR server 106 has completed processing of the transformed speech input signal, it returns its recognition results back to the local device 100, step 207, for further processing by the local ASR processing arrangement 102. Different specific embodiments may have different specific arrangements as to exactly what is done in this regard. For example, if the remote ASR processing condition is met, the local ASR arrangement 102 may continue the local ASR processing including additional processing of the recognition results from the remote ASR server 106 to produce its final recognition output interpretation 108. Or if the remote ASR processing condition is met, the local ASR arrangement 102 processes may suspend local ASR processing except for processing speech recognition results received from the remote ASR server 106 so that the output interpretation 108 is based solely on the remote recognition results.

Figure 3:
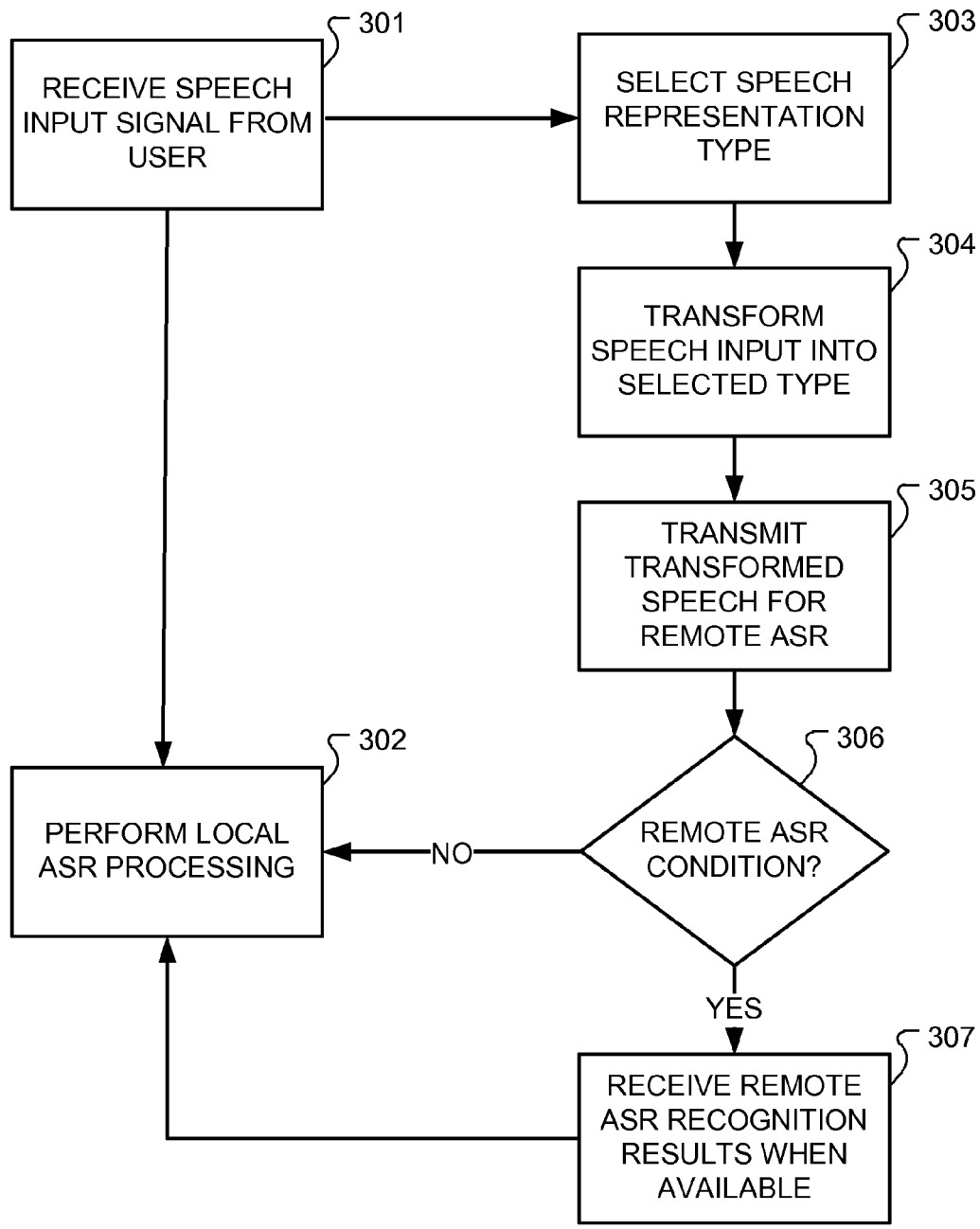
FIG. 3 shows various functional steps in a hybrid ASR arrangement according to another embodiment of the present invention.

In some other specific embodiments, the local controller 104 may transform the speech input signal and send the transformed speech input signal only if the remote ASR processing condition is met. FIG. 3 shows various functional steps in such an embodiment where the mobile device 100 initially receives an unknown speech input signal from a user, step 301, and forwards it to the local ASR arrangement 102 for local ASR processing, step 302. The local controller may suspend transforming the speech input signal and sending the transformed speech input signal if it determines that the remote ASR condition is not met. The local controller 104 automatically selects a specific one of the different speech representation types, step 303, transforms the speech input signal into the selected type of speech representation, step 304, and sends the transformed speech input signal to the remote ASR server 106, step 305. The local controller 104 also determines if the remote ASR processing condition is met, step 306, and if so, receives those remote recognition results when they become available, step 307. If in step 306 the local controller 104 determines that the remote ASR processing condition is not met, then the output interpretation 108 will be based solely on the recognition results from the local ASR processing arrangement 102.

In such an embodiment, the local controller may determine if the remote ASR processing condition is met, step 306 while the local ASR arrangement 102 is performing the local ASR processing. In that case, after the local controller 104 determines that the remote ASR processing condition is met, it may start sending the transformed speech signal to the remote server, step 304, starting from the beginning of the speech input signal. Or the local controller 104 may determine if the remote ASR processing condition is met, step 306, after the local ASR arrangement 102 produces a local recognition result, for example, based on the local recognition results and its confidence.

In any embodiment, the local controller 104 may select one of the speech representation types based on different bandwidth characteristics of the speech representation types. For example, one specific embodiment may be based on three different types of speech representations:
1) ASR feature vectors—since they are already computed by the local ASR arrangement 102, this is an inexpensive option (unless the remote ASR server 106 uses a different kind of feature stream)
2) Compressed speech with lossy compression. The compression rate can be determined depending on available network bandwidth and compression complexity (amount of computes spent for compression) can be adjusted to current battery status and available compute power on the mobile device 100.
3) Uncompressed or lossless compressed speech.

In cases where the type of speech representation is anything less than an uncompressed waveform, some embodiments may send the uncompressed waveform later for adaptation and assessment purposes. For any of the various different speech representation types, it may be advantageous to do some local signal enhancement on the mobile device 100 before sending the speech signal to the remote ASR server 106. Examples of specific such enhancement techniques include without limitation noise suppression/reduction, de-reverberation, beam-forming and echo compensation. It can be advantageous to perform such signal enhancement techniques on the mobile device 100 before sending the speech representation signal through lossy compression. This is known to make such signal enhancement techniques more effective as well as allowing reduced compression loss. In addition, such enhancement techniques are highly likely to be performed—if available on the mobile device 100—for the local ASR arrangement 102 anyways. And in the specific case of beam-forming, performing it locally on the mobile device 100 allows sending the beam-formed speech representation signal to the remote ASR server over a signal channel, whereas by contrast, performing such signal beam-forming on the remote ASR server 106 would require transmitting over multiple channels.

In specific embodiments, the remote ASR processing condition may be a function of one or more of recognition confidence associated with local ASR processing of the speech input, a connection condition between the mobile device and the remote server, a projected accuracy benefit associated with the remote ASR processing, a local ASR processing latency characteristic, a remote ASR processing latency characteristic, and/or a recognition cost characteristic.

For example, an estimate of the accuracy benefit associated with the remote ASR processing should take into account the consideration that if both the local ASR arrangement 102 and the remote ASR server 106 are likely to arrive at the same recognition conclusion, then there is no accuracy benefit to sending the speech input on to the remote server 106. An estimate of the accuracy improvement due to remote ASR processing may also take into account one or more of the following:
  Signal-to-Noise Ratio (SNR)
  Length of the speech input
  Computational characteristics of the local mobile device 100 including number of cores, CPU speed, memory, etc.
  Recent recognition results from the current user
  Local recognition confidence
    If the local recognition confidence is high, server side processing may be stopped. This will particularly speed recognition processing in any local cache grammar
    If the local recognition confidence on a particular word is low, that may reflect a local out-of-vocabulary (OO) input which should be sent to the remote ASR server 106.
  Partial recognition results—if the current speech input is partially decoded and likely to contain a command which requires server resources (e.g., a web search query), then the speech input should be sent on to the remote ASR server 106.
  Other characteristics that may suggest the current speech input will require information more likely to be found on the remote ASR server 106.
  Metadata about the recognition problem such as application state and dialog context
    If the system is asking for a simple "Yes/No" answer, then the remote ASR server 106 is less likely to improve recognition performance over the local ASR arrangement 102
    Observations across many different users can be used to estimate the likely benefit of recognition by the remote ASR server 106 in a particular metadata context.
    If the system is asking for a user input that is likely to require server resources, such as a complex web search It is worth noting that accuracy per se can only be ascertained from user feedback or manual review (e.g. transcription of the audio). But for the purpose of a remote ASR processing condition, it can be predicted whether and how-often the remote recognition result from the remote ASR server 106 will be significantly different from the local recognition result of the local ASR arrangement 102 based on comparing previous local and remote recognition results produced under similar conditions (application state, dialog context, SNR, etc.). It can be assumed that when the recognition results are likely to differ, then the remote ASR server 106 is expected to be of higher accuracy and thus preferred. This decision as to the remote ASR processing condition can be highly adaptive without supervision (i.e., automatically) so as to take into account available metadata. This adaptation can be useful to allow the system to adjust to changes in the current operating environment, such as changes in load on the remote ASR server 106. Adaptation can also be very "fine-grained", that is, it can be dependent on specific characteristics of the speaker, the mobile device 100, or state of the current dialog. This adaptation depends on comparing recognition results from the remote ASR server 106 with local recognition results from the mobile device 100. But on those trials where the system decides not to send the speech to the remote ASR server 106, the server side recognition results would not normally be available. Hence, in order to collect information to support this adaptation, the system may sometimes send utterances which it would not normally send. It would do this relatively rarely (perhaps only 1% of the utterances), and it could mark these utterances for low priority processing on the remote ASR server 106.

The remote ASR processing condition may be a function of other conditions such as a local ASR processing latency characteristic (i.e., an estimate of the recognition speed of the local ASR arrangement 102). This may be influenced by such factors as computational characteristics of the local mobile device 100 (e.g., number of cores, CPU speed, memory, etc.) and/or load condition at the mobile device 100 (e.g., CPU and memory utilization by the operating system and other running applications at the time when the recognition is about to start). Another consideration may be a remote ASR processing latency characteristic (i.e. latency until a recognition result is received at the mobile device 100). This may be influenced by such factors as data channel conditions and server load (if the remote servers are currently very busy, then don't send). Ideally embodiments seek to not only reduce response latency, but also reduce its variability. Large latency variances can be detrimental to usability for similar or same commands or command categories. For some applications, it may be acceptable for the system to have somewhat higher overall response latency, but prefer to have lower variance in the average latency time.

The remote ASR processing condition also may be a function of one or more recognition cost characteristics such as user's data plan billing status (don't send when the user has used most of their data allowance for the month), server load (if the remote servers are currently very busy, then don't send), and battery status (when the battery is low, sending is more expensive) In the latter case, the local controller 104 might decide to entirely forego sending a speech signal to the remote ASR server 106, or it might do the opposites— end the speech on to the remote ASR server 106 and entirely omit processing by the local ASR arrangement 102.

The local controller 104 may initially determine if the remote ASR processing condition is met at the beginning of speech input, and in some embodiments may reassess that during the course of a speech input. That is, before speech input began, the local controller 104 might decide not to send a new speech input to the remote ASR server 106, and then during the course of recognition or after, local confidence information might cause the local controller 104 to start streaming speech representations to the remote ASR server 106, including a block of data representing the entire speech input from the beginning of the utterance. And conversely, at the beginning of a speech input the local controller 104 may decide to stream speech representations to the remote ASR server 106, but by the end of the speech input the overall recognition confidence may be high, and the local controller 104 might then stop the server side recognition. Some embodiments may also randomly choose some speech inputs to send to the remote ASR server 106 for checking the reliably of the recognition benefit estimate, in which case, we can the local recognition result from the local ASR arrangement 102 may be used without waiting for the result from remote ASR server 106.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A mobile device adapted for automatic speech recognition (ASR) of speech input, the mobile device comprising:
   a local ASR arrangement configured to perform local ASR processing of the speech input including processing any speech recognition results received from a remote server; and
   a local controller configured to perform:
      sending the speech input to the local ASR arrangement;
      sending the speech input to the remote server for remote ASR processing; and
      after sending the speech input to the remote server, determining if a remote ASR processing condition is met,
   wherein the local controller determines if the remote ASR processing condition is met while the local ASR arrangement processes the speech input, and
   wherein local ASR recognition processes are suspended by the local ASR arrangement in response to the local controller determining that the remote ASR processing condition is met so that recognition results solely from the remote ASR processing are used to produce an output interpretation of the speech input.

2. The mobile device according to claim 1, wherein the local controller transforms the speech input into a selected one of a plurality of different speech representation types, and wherein the local controller transforms the speech input signal and sends the transformed speech input.

3. The mobile device according to claim 2, wherein the local controller suspends transforming the speech input signal and sending the transformed speech input signal if it determines that the remote ASR condition is not met.

4. The mobile device according to claim 1, wherein the local controller transforms the speech input signal into a selected one of a plurality of different speech representation types, and wherein the local controller selects one of the speech representation types based on different bandwidth characteristics of the speech representation types.

5. The mobile device according to claim 1, wherein the remote ASR processing condition is a function of a connection condition between the mobile device and the remote server.

6. The mobile device according to claim 1, wherein the remote ASR processing condition is a function of a projected accuracy benefit associated with the remote ASR processing.

7. The mobile device according to claim 6, wherein the projected accuracy benefit is based on a metadata function reflecting one or both of application state and dialog context.

8. The mobile device according to claim 1, wherein the remote ASR processing condition is a function of one or both of a local ASR processing latency characteristic and a remote ASR processing latency characteristic.

9. The mobile device according to claim 1, wherein the remote ASR processing condition is a function of a recognition cost characteristic.

10. The mobile device according to claim 1, wherein the local controller transforms the speech input signal into a selected one of a plurality of different speech representation types, and wherein the plurality of different speech recognition types include one or more of ASR feature vectors, lossy compressed speech, lossless compressed speech, and uncompressed speech.

11. The mobile device according to claim 1, wherein determining if the remote ASR processing condition is met reflects an adaptation process based on speech recognition operation over time.

12. The mobile device according to claim 11, wherein the adaptation process is an automatic unsupervised adaptation process.

13. A method for automatic speech recognition (ASR) of a speech input, the method comprising:
   sending the speech input to a local ASR arrangement;
   sending the speech input to a remote server for remote ASR processing;
   and after sending the speech input to the remote server, determining if a remote ASR processing condition is met, wherein determining if the remote ASR processing condition is met occurs while the local ASR arrangement processes the speech input;
   and when the remote ASR processing condition is determined to be met, suspending speech processing by the local ASR arrangement so that recognition results solely from the remote ASR processing are used to produce an output interpretation of the speech input.

14. The method of claim 13, further comprising transforming the speech input into a selected one of a plurality of different speech representation types, and wherein sending the speech input comprises sending the transformed speech input.

15. The method of claim 13, further comprising transforming the speech input into a selected one of a plurality of different speech representation types based on different bandwidth characteristics of the speech representation types.

16. At least one non-transitory computer-readable storage medium storing processor-executable instructions that when executed by a computer system, cause the computer system to perform a method for automatic speech recognition (ASR) of a speech input, the method comprising:
   sending the speech input to a local ASR arrangement;
   sending the speech input to a remote server for remote ASR processing;
   and after sending the speech input to the remote server, determining if a remote ASR processing condition is met, wherein determining if the remote ASR processing condition is met occurs while the local ASR arrangement processes the speech input;
   and when the remote ASR processing condition is determined to be met, suspending speech processing by the local ASR arrangement so that recognition results solely from the remote ASR processing are used to produce an output interpretation of the speech input.

17. The at least one non-transitory computer-readable storage medium of claim 16, wherein the method further comprises transforming the speech input into a selected one of a plurality of different speech representation types, and wherein sending the speech input comprises sending the transformed speech input.

\* \* \* \* \*